United States Patent [19]

Boy et al.

[11] E Patent Number: Re. 33,470

[45] Reissued Date of Patent: Dec. 4, 1990

[54] SYSTEM FOR RECOVERING A HUNTING ARROW

[76] Inventors: Dan D. Boy, R.D. #3, Box 481-H, Latrobe, Pa. 15650; Harold H. Frederick, 600 Santone Dr., Greensburg, Pa. 15601

[21] Appl. No.: 430,237

[22] Filed: Oct. 31, 1989

Related U.S. Patent Documents

Reissue of:

[64] Patent No.: 4,704,612
Issued: Nov. 3, 1987
Appl. No.: 903,473
Filed: Sep. 4, 1986

[51] Int. Cl.[5] ..... G01S 1/08

[52] U.S. Cl. ..... 342/386; 273/416

[58] Field of Search ..... 342/386, 419, 385; 273/416, 213

[56] References Cited

U.S. PATENT DOCUMENTS

| | | | |
|---|---|---|---|
| 3,150,875 | 9/1964 | Searles . | |
| 3,351,347 | 11/1967 | Smith et al. | 273/213 |
| 3,580,176 | 5/1971 | Boswell | 102/216 |
| 3,790,948 | 2/1974 | Ratkovich | 342/386 |
| 4,421,319 | 12/1983 | Murphy . | |
| 4,675,683 | 6/1987 | Robinson et al. | 342/386 |
| 4,749,198 | 6/1988 | Brailean | 340/636 |
| 4,858,935 | 8/1989 | Capson | 273/416 |
| 4,885,800 | 12/1989 | Ragle | 273/416 |

*Primary Examiner*—Theodore M. Blum
*Attorney, Agent, or Firm*—Clifford A. Poff

[57] ABSTRACT

A method and apparatus for tracking an arrow and/or game animal shot in the sport of archery hunting is disclosed. The arrow contains a radio-frequency transmitter in a circuit also containing a power supply, and an inertia-activation switch in the shaft thereof. The circuit is of a size and weight so as not to alter the flight characteristics of the arrow. Once shot, the inertia-activation switch momentarily closes, causing the transmitter to transmit a signal. The archer carries a radio-frequency receiver with a directional antenna and a magnitude indicator and earphone coupled thereto to allow tracking and retrieval of the arrow and game animal.

26 Claims, 3 Drawing Sheets

SYSTEM FOR RECOVERING A HUNTING ARROW

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates generally to remote tracking systems, and more particularly, to a system for retrieving a hunting arrow or a hunting arrow and game animal shot in the sport of archery hunting.

2. Description of The Prior Art

In the sport of archery hunting, a game animal may travel long distances after having been shot with an arrow. In many cases, when the animal travels a long distance, the blood trail left by the animal is difficult to follow. The terrain may be too rugged to permit adequate tracking, the animal may travel through water, the wound may clot, the blood may be washed away by rain or the animal may only bleed internally and leave no blood trail. In these situations, the wounded animal is often lost, and never recovered. Such a situation generates a bad image for archery hunters, as well as needlessly wasting a natural resource. A means to reliably track the game animal once it has been shot with an arrow has long been desired.

In the prior art, several attempts have been made to resolve this problem, but have achieved very limited success.

In U.S. Pat. No. 3,150,875 a detection means is disclosed whereby two chemicals are contained in the shaft of the arrow in separate vials. Upon impact with the game animal, or the ground, the vials break and the intermixing of the two chemicals produces visible smoke. By following the trail of smoke, the archer may track the animal or retrieve the arrow. In thickly wooded areas, however, the smoke is only visible for a very short distance. Additionally, if there is any wind or even a slight breeze, the smoke trail may be disbursed and result in an undistinguishable trail.

In U.S. Pat. No. 3,417,944, a hunting arrow is disclosed which includes a continuous line of marking yarn connecting the bow to the arrow, which, upon shooting of an arrow, creates a trail marking the path of the wounded animal. However, in many instances, the yarn becomes entangled in trees or brush thereby causing the fleeing animal to break the string. Additionally, when the animal runs a long distance, there may not be enough string to provide an adequate trail. Furthermore, when the arrow is shot, the string produces a drag on the arrow which [effects] *affects* the flight and accuracy of the shot. This reduces the quality level of the archer's shooting ability, and, therefore, may actually create a situation in which even more wounded animals are not recovered.

In U.S. Pat. No. 4,421,319, an arrow is disclosed which includes a device in the nock of the arrow which produces an audible signal. Because the tail end of the arrow is frequently broken as the animal runs through the woods, the nock containing the device for producing the audible signal frequently does not remain with the wounded animal but simply falls to the ground at the location the arrow was broken. In situations in which the arrow is not broken, the audible signal may frighten the wounded animal so that it runs abnormally long distances in a futile effort to escape the sound. This may result in the animal running out of the range of hearing of the archer, thereby again lessening the possibility of recovering the animal rather than increasing the possibility.

In U.S. Pat. No. 3,790,948, a hunting arrow is disclosed which includes a radio frequency transmitter carried in a broadhead of the arrow. The transmitter is coupled to a rigid antenna in the arrow shaft to propagate the signal generated by the transmitter. The archer carries a radio frequency receiver to receive the signal generated by the transmitter. The device was several inherent disadvantages, however. The system requires the use of a special broadhead containing the transmitter. The broadhead is too large and heavy to meet archery standards. Since weight is a critical factor in determining the flight of the arrow and subsequent accuracy of the shot, the hunting arrow cannot be shot accurately. Additionally, the broadhead is so wide that even if the target is hit, the penetration characteristics of the arrow are poor. Additionally, activation of the transmitter results from insertion of a battery in the broadhead or, alternatively, by closing a manual switch. The deactivation of the transmitter results from a reverse process. As a practical matter, activation of the transmitter in this manner requires activation well before the arrow is shot. This requires the transmitter to transmit continuously during hunting, thereby reducing the useful life of the battery. It is further quite inconvenient to assemble and disassemble the broadhead each time it is desired to activate or deactivate the transmitter. Furthermore, the device employs a rigid antenna made of spring steel within the hollow arrow shaft. The rigid antenna further increases the weight of the arrow assembly. This again is detrimental to the flight and accuracy of the arrow. Still further, the device requires the archer to purchase a special broadhead, a special arrow, and fastening clips to assemble the device. Most archers prefer to utilize arrows and broadheads of their choice, but this system does not provide that freedom.

It is therefore an object of the present invention to provide a system for tracking an arrow or arrow and game animal in the sport of archery hunting.

It is a further object of the present invention to provide a system for tracking an arrow which includes a transmitter enclosed inside the hollow arrow while maintaining a weight such as to allow the arrow to be shot in a conventional manner.

It is a still further object of the present invention to provide an inertia-activation means which permits the transmitter to remain in the deactivation mode until the arrow is shot.

SUMMARY OF THE PRESENT INVENTION

In accordance with the present invention, a system for tracking game in the sport of archery hunting includes a conventional hollow metallic, graphite, or fiberglass arrow shaft with a conventional metal arrow broadhead connected at one end thereof and a nock at the other end thereof. The system further includes a transmitter comprised of surface-mount technology of discrete transistors and components located inside the hollow shaft and spaced a certain distance from the broadhead but electrically coupled thereto to allow the broadhead and if metallic, also the arrow shaft, to act as a primary antenna. A power supply, such as, but not necessarily limited to, a lithium battery, is also located inside the hollow shaft and coupled to the transmitter to provide the transmitter with electrical power. Further included in the circuit containing the transmitter and power supply in an inertia-activation switch to provide the transmitter with power after the force of inertia causes the switch to momentarily close. The system further includes a remote receiver means with a directional antenna coupled thereto to allow reception and tracking of the arrow containing the transmitter. A magnitude indicator and earphone coupled to the receiver provides an indication of the proximity and direction of the arrow and transmitter.

In use, an archer shoots the arrow at the game thereby causing the inertia-activation switch to momentarily close. This triggers an electronic latch circuit and provides the transmitter with electrical power necessary to transmit a signal. The archer, carrying the remote receiver, then tracks the signal transmitted by the transmitter, allowing the arrow to be recovered. The transmitter may be deactivated by passing a magnet past the reed relay along the outside of the arrow shaft.

BRIEF DESCRIPTION OF THE DRAWINGS

The invention may be better understood and further advantages and uses thereof more readily apparent when considered in view of the following detailed description of exemplary embodiments taken with the accompanying drawings in which.

DESCRIPTION OF THE PREFERRED EMBODIMENT

Figure 1:
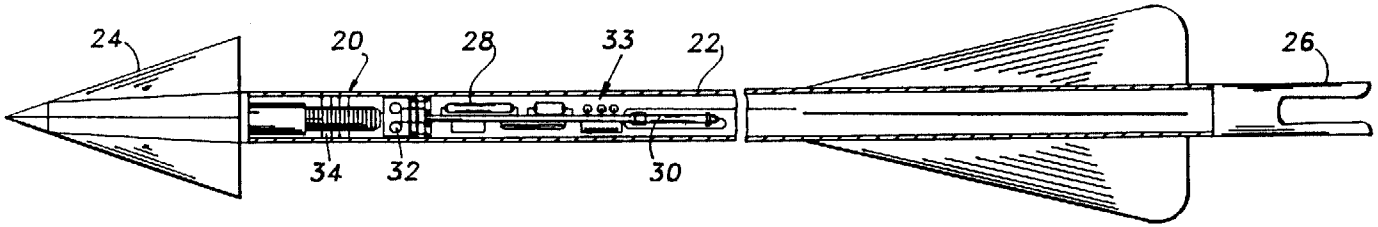
FIG. 1 is a cross-sectional [pan] *plan* view of an arrow of the present invention.

Referring now to FIG. 1, a conventional arrow 20 is comprised of a hollow metallic shaft 22, a conventional arrow broadhead 24 at a first end of the shaft 22, and a nock 26 at a second end of the shaft 22. Shaft 22 may, alternatively, be comprised of other materials, such as graphite or fiberglass. The nock 26 is the connecting means to allow the arrow 20 to be propelled by a bow (not shown). Located inside the shaft 22 is a transmitter circuit 28, a battery power supply 30, and an inertia-activation switch means 32, referred to generally as circuit 33. A nylon insert 34 holds the circuit containing the transmitter 28 in a fixed portion inside the shaft 22.

Figure 2C:
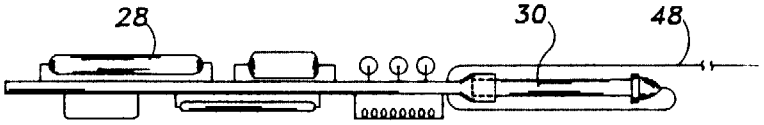
FIGS. 2A, B and C are exploded views of the nylon insert, inertia-activation switch means, and transmitter, respectively, of the present invention.
Figure 2B:
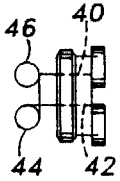
Figure 2A:
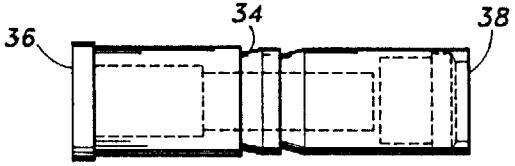

Shown more clearly in the exploded view of FIG. 2A, the nylon insert 34 is open at both ends. The first end 36 of the insert 34 is formed so as to allow insertion and coupling portion of the arrow broadhead 24 and the second end 38 of the insert 34 is formed so as to allow insertion of the inertia-activation switch means 32 to hold the circuit coupled thereto in a fixed position inside the arrow shaft 22. The nylon insert 34 includes an insulated thin wire (not pictured) to provide a connection between the transmitter circuit 28 and the arrow broadhead 24; the transmitter ground [plate] *plane* is then capacitively coupled to the arrow shaft 22. This electrical connection allows the broadhead 24 to act as the primary antenna against the arrow shaft 22 acting as its counterpoise which provides the means to transmit the signal generated by the transmitter circuit 28.

Figure 3:
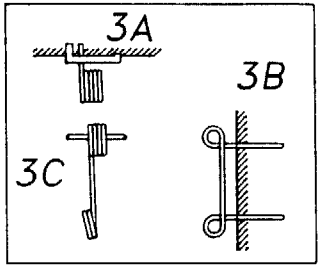
FIGS. 3A, B and C are top, side, and frontal views of the inertia-activation switch means of the present invention.

Shown in FIG. 2B is a side view of the inertia-activation switch means 32. Switch means 32 is normally open and includes two wire contacts 40 and 42. One end of wire contact 42 consists of a torsion spring 44. As shown in FIG. 2B, and further in FIGS. 3A–C, the torsion spring 44 is weighted on one leg with additional coils 46. Alternatively, the coils 46 could be a small mass of metal. When the coils 46 touch the contact 40, such as when the arrow 20 is shot, contacts 40 and 42 are momentarily coupled through the torsion spring 44 and coils 46, thereby triggering the electronic latch circuit and closing the series connection of the circuit 33 containing the battery power supply 30 and the transmitter circuit 28.

Shown in FIG. 2C is an exploded view of the transmitter circuit 28 and the battery power supply 30 showing the relative positions thereof. Also shown in FIG. 2C is a portion of secondary antenna 48 which extends along the length of the arrow shaft. The secondary antenna 48 is comprised of a very thin flexible metal wire and acts as an antenna for the transmitter 28 in the event that the arrow shaft 22 which acts as the primary antenna is broken. In embodiments in which shaft 22 is comprised of a nonconductive material, antenna 48 acts as the primary antenna means.

Figure 4:
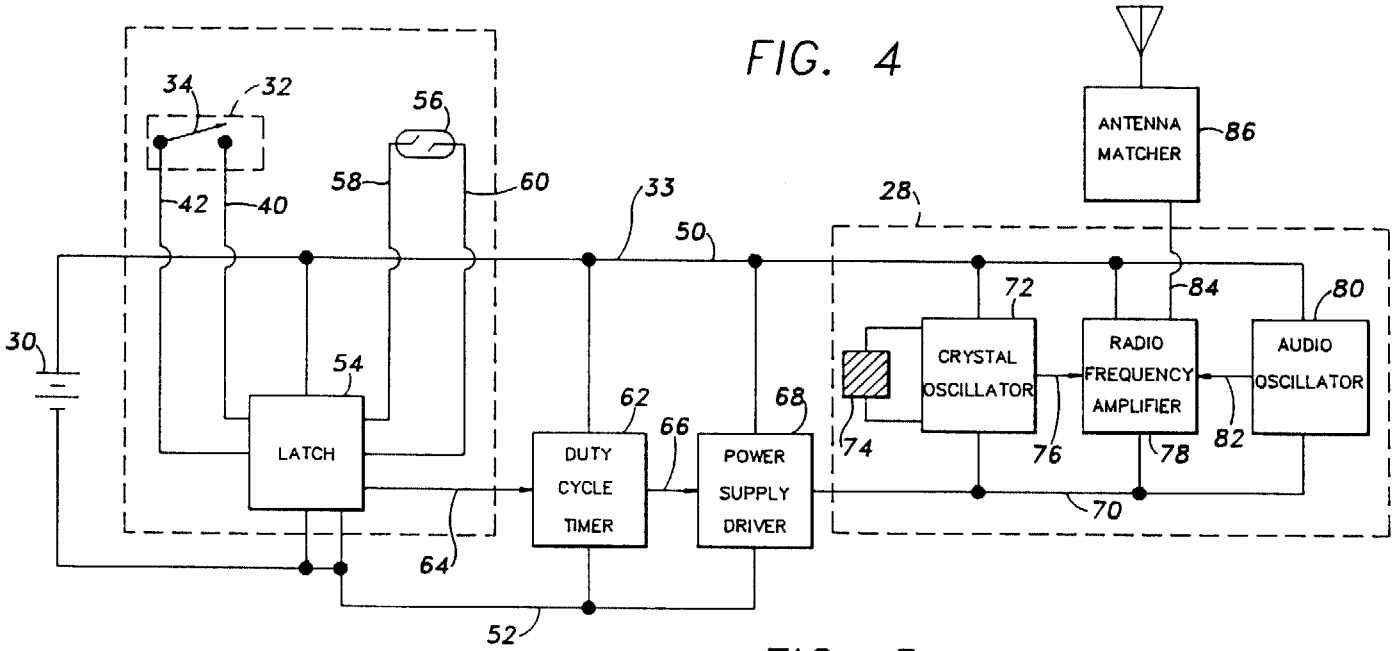
FIG. 4 is a block diagram of a transmitter circuit which may comprise the transmitting means of the present invention.

FIG. 4 is a block diagram of the circuit 33 which includes the transmitter circuit 28, inertia-activation switch means 32, and battery power supply 30. Coupled to the positive terminal of the battery power supply 30 is line 50 and coupled to the negative terminal of supply 30 is line 52. Latch 54 is coupled to wire contacts 40 and 42 and is powered by connection to lines 50 and 52. Because the inertia-activation switch means 32 is only momentarily closed upon the shooting of the arrow 20, the latch 54 keeps the circuit 33 closed after the inertia-activation switch means 32 reopens. Latch 54 is unlatched by momentarily closing the deactivation reed switch 56 which is coupled to latch 54 by lines 58 and 60. The deactivation switch 56 may be closed by passing a permanent magnet past the switch 56 along the outside of the arrow shaft. When activated, latch 54 connects the negative battery supply to a duty cycle timer 62 through line 64. Duty cycle timer 62 is powered by connection to lines 50 and 52. The timer 62 acts to extend the life of the battery by producing a pulsed signal on line 66 in response to the existence of a signal on line 64. Line 66 is coupled to a power supply driver 68. The power supply driver 68 is powered by connection to lines 50 and 52 and acts as an internal switch allowing the transmitter circuit 28 to function only during those times in which the duty cycle timer 62 cycles to a "high" voltage. Power supply driver 68 creates a potential difference between line 50 and 70 only during times in which the signal on line 66 cycles to a "high" voltage.

Transmitter circuit 28 is comprised of a crystal oscillator 72 which is powered by connection to lines 50 and 70. The oscillator 72 is coupled to a crystal 74 and produces a high-frequency output on line 76 which is fed to a radio frequency amplifier 78. The amplifier 78 is powered by connection to line 50 and 70 and also is provided with an input from an audio oscillator 80 which produces a low frequency, e.g. 400 hertz, signal on line 82. The amplifier 78 produces an amplitude modulated signal from the combination of the two signals on lines 76 and 82 and feeds the amplitude modulated signal on line 84 to an antenna matcher 86 which matches the impedance of the circuit to the impedance of the antenna.

Figure 5:
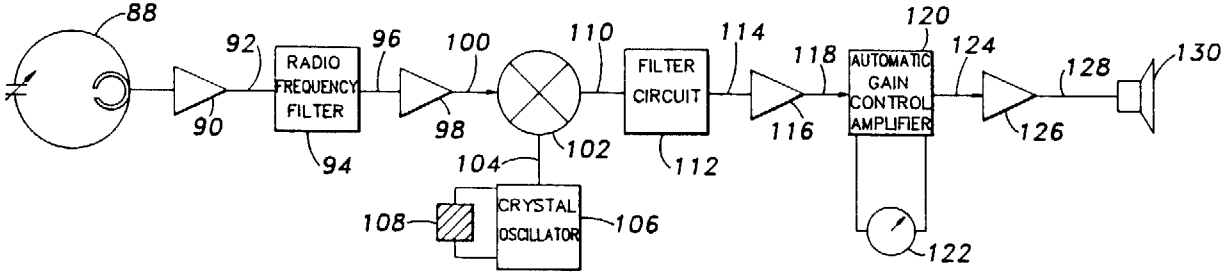
FIG. 5 is a block diagram of a receiver circuit which may comprise the receiving means of the present invention.

A block diagram of a remote receiver used to receive the signal generated by the transmitter circuit 28 is shown in FIG. 5. A directional loop antenna 88 receives a transmitted signal from the transmitter circuit 28. The received signal is coupled to an input of a radio frequency preamplifier 90. The signal generated by the preamplifier 90 is fed through line 92 to a radio frequency filter 94. The filter 94 is a band pass filter which produces a filtered signal on line 96. A signal on line 96 is input to a radio frequency amplifier 98 which produces a new amplified signal on line 100. The amplified signal on line 100 is fed to a mixer circuit 102 which is also coupled to a crystal oscillator 106 through line 104. The mixer circuit 102 demultiplexes the signal and produces demultiplexed signal on line 110. The signal on line 110 is fed to a second filter circuit 112. A new filtered signal is produced on line 114 which is fed to [a] *an* amplifier 116 which produces an amplified signal on line 118. The amplified signal on line 118 is fed to an integrated circuit modulation detector and automatic gain control amplifer 120. The detector and amplifier [.] 120 are connected to a signal strength meter 122 which may, for example, be a current measuring device. The detector and amplifier 120 produces a signal on line 124 which is fed to an audio frequency amplifier 126 which produces a signal on line 128 which is connected to a miniature phone jack 130 for output to an external speaker, such as an earphone.

In use, the tracking system of the present invention allows an archer to track an arrow 20 after it has been shot. Before shooting, the inertia-activation switch means 32 is open, and no signal is transmitted by the transmitter circuit 28. When the archer sights his target, he places the nock 26 of the arrow 20 in the string of the bow, and propels the arrow 20 to the target. The propulsion of the arrow 20 causes the coils 46 of inertia-activation switch means 32 to momentarily contact the wire contact 40. Momentary closure of the inertia-activation switch means 32 latches the circuit 33 closed through latch 54. The latch 54 produces a signal on line 64 which is fed to the duty cycle timer 62 which produces a pulsed signal on line 66 to drive the power supply driver 68. The power supply driver 68 allows the transmitter circuit 28 to generate and transmit a signal through the primary antenna means comprised of the arrow shaft 22 and arrow broadhead 24, or, alternatively, through the secondary antenna 48. The secondary antenna 48 functions in the event that a portion of the arrow shaft 22 breaks away from the game while the game attempts to flee, or in embodiments in which shaft 22 is comprised of a non-conductive material.

Figure 6:
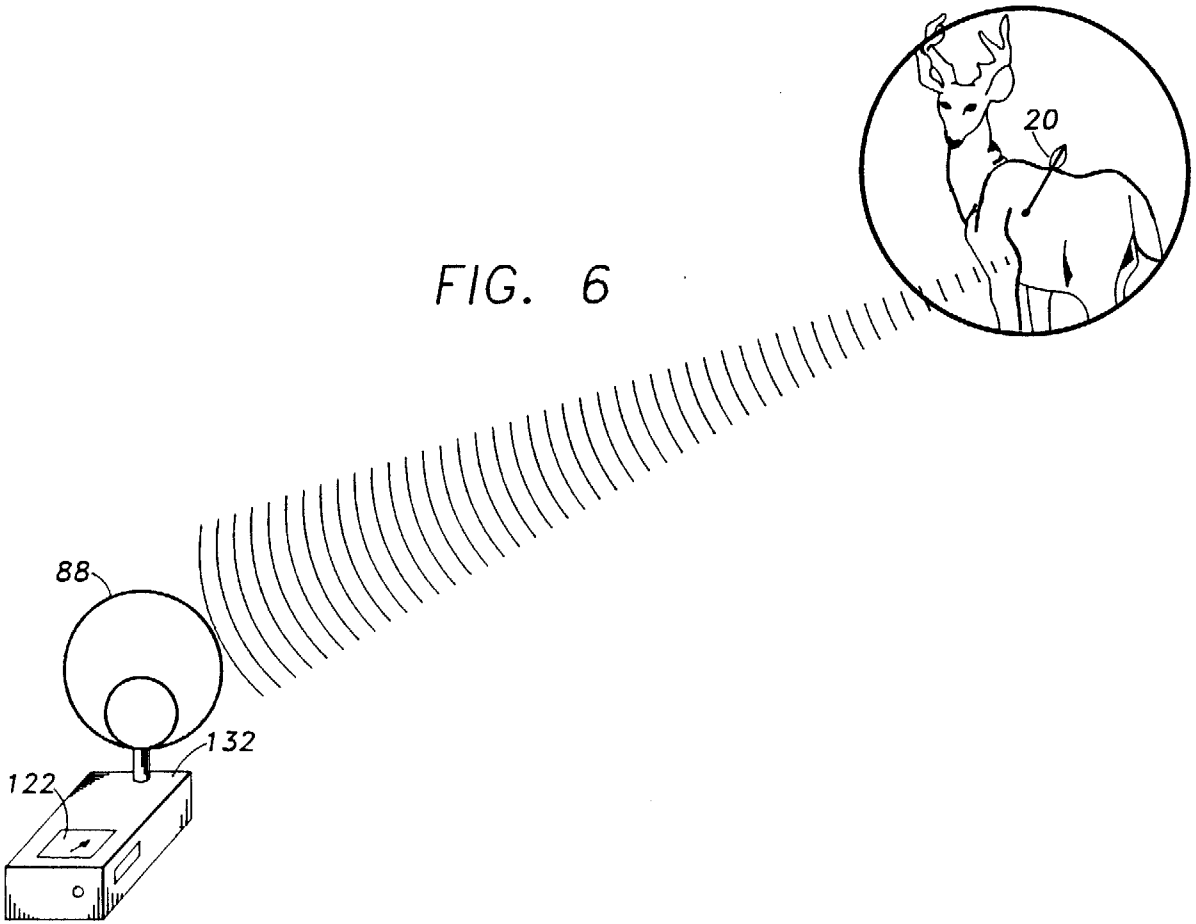
FIG. 6 is a pictorial view depicting the application of the present invention in the sport of archery hunting.

After the arrow 20 has been shot, the archer may direct the remote receiver shown as 132 in FIG. 6, in the general direction in which the shot was fired. Because the antenna 88 is directional, the magnitude of the signal received by the receiver 132 as indicated on strength meter 122 varies with the direction [with] *in* which the receiver 132 and antenna 88 is pointed. By following the direction of the strongest signal as indicated by the meter 122 or the jack 130 for an earphone, the arrow 20 may be tracked by the archer. When the arrow 20 has been recovered, the latch 54 may be deactivated, thereby turning off the transmitter circuit 28, by simply passing a magnet along the arrow shaft 22 to open the relay 56. The arrow 20 may then be reused.

While the present invention has been described in connection with the preferred embodiments shown in FIGS. 1–6, it is understood that other similar embodiments may be used or modifications and additions may be made to the described embodiment for performing the same functions of the present invention without deviating therefrom. Therefore, the present invention should not be limited to any single embodiment, but rather construed in breath and scope in accordance with the recitation of the appended claims.

We claim:

1. In archery hunting, a system for tracking game, including:

an arrow comprised of a shaft joined to an arrow head at one end thereof and a nock at the opposite end thereof for allowing driving of said arrow by an archery bow, said arrow including a hollow metal shaft part supporting said arrow head which includes metal parts capable of emitting a radio frequency signal;

transmitting means inside said hollow metal shaft part and connected electrically to the metal parts of said arrow head for emitting a radio-frequency signal whereby said metal parts of the arrow head act as a primary antenna;

a secondary antenna electrically connected to said transmitting means while extending within a portion of the hollow metal shaft part of the arrow; and power supply means for providing power to said transmitting means.

2. The system of claim 1 further including a flexible wire extending inside said shaft from said transmitting means toward said nock to act as a secondary antenna in the event the arrow shaft is broken.

3. The system according to claim 1 further including an inertia-activation switch electrically connected with said transmitting means and said power supply means to provide said transmitting means with electrical power when said switch is closed.

4. The system according to claim I further including receiving means for receiving a radio-frequency signal produced by said transmitting means;

said receiving means including a directional antenna to directionally monitor the radio-frequency signal; and indicating means coupled to indicate the magnitude of said radio-frequency signal received by said receiving means.

5. The system of claim 1 wherein said transmitting means includes a surface mount integrated circuit.

6. The system of claim 1 wherein said power supply means includes a battery.

7. The system of claim 3 wherein said inertia-activation switch is caused to be closed when said arrow is propelled by an archery bow.

8. The system of claim 7 wherein said inertia-activation switch includes a first wire contact which consists of a torsion spring, and a metal weight attached to a second end of said torsion spring for contacting with a second wire contact.

9. The system of claim [1] *4* wherein said receiving means includes an audio indicator to provide an audible signal indicative of the magnitude of said radio-frequency signal received by said receiving means.

10. A method for locating an arrow launched by an archery bow, said method including the steps of:

aiming an arrow containing a radio-frequency transmitting means and a secondary antenna within a hollow metal arrow shaft part at a target, propelling the arrow towards said target causing a primary antenna formed by metal parts of an arrow head at one end of the arrow to emit a radio frequency signal;

detecting said signal by a radio receiver which receiver includes a directional antenna to allow detection of said signal transmitted by either of said primary antenna or said secondary antenna.

11. The method according to claim 10 wherein said step of propelling the arrow includes operating an inertia-activation switch to connect said power supply to said transmitting means.

12. The method according to claim 11 including the further steps of recovering said arrow and magnetically activating a reed relay switch to deactivate said transmitting means.

*13. In archery hunting, a system for tracking game, said system including:*

*an arrow comprised of a shaft joined to an arrow head at one end thereof and a nock at the opposite end thereof for allowing driving of said arrow by an archery bow, said arrow including a hollow metal shaft part supporting said arrow head which includes metal parts capable of emitting a radio frequency signal;*

*transmitting means inside said hollow metal shaft part and connected electrically to the metal parts of said arrow head and said metal shaft part for emitting a radio-frequency signal whereby said metal shaft part and said metal parts of the arrow head acts as a primary antenna comprising a radiating element and counterpoise element,*

*a secondary antenna electrically connected to said transmitting means while extending within a portion of the hollow shaft part of the arrow; and*

*power supply means for providing power to said transmitting means.*

*14. The system of claim 13 further including a flexible wire extending inside said shaft from said transmitting means toward said nock for forming the secondary antenna.*

*15. The system of claim 13 further including an inertia-activation switch electrically connected with said transmitting means and said power supply means to provide said transmitting means with electrical power when said switch is closed.*

*16. The system of claim 15 wherein said inertia-activation switch is caused to be closed when said arrow is propelled by an archey bow.*

*17. The system of claim 15 wherein said inertia-activation switch includes a first wire contact which consists of a torsion spring, and a metal weight attached to a second end of said torsion spring for contacting with a second wire contact.*

*18. The system according to claim 13 further including receiving means for receiving a radio-frequency signal produced by said transmitting means;*

*said receiving means including a directional antenna to directionally monitor the radio-frequency signal; and*

*indicating means coupled to indicate the magnitude of said radio-frequency signal received by said receiving means.*

*19. The system of claim 18 wherein said receiving means includes an audio indicator to provide an audible signal indicative of the magnitude of said radio-frequency signal received by said receiving means.*

*20. The system of claim 13 wherein said transmitting means includes a surface mount integrated circuit.*

*21. The system of claim 13 wherein said power supply means includes a battery.*

*22. In archery hunting, a system for tracking game, said system including:*

*an arrow comprised of a shaft joined to an arrow head at one end thereof and a nock at the opposite end thereof for allowing driving of said arrow by an archery bow, said arrow including a primary antenna formed by a hollow metal shaft part of the arrow and metal parts of said arrow head;*

*transmitting means coupled electrically to said primary antenna, said transmitting means being positioned inside said hollow shaft part for transmitting a radio-frequency signal;*

*a secondary antenna electrically connected to said transmitting means while extending within a portion of the hollow shaft part of the arrow; and*

*power supply means for providing power to said transmitting means.*

*23. The system of claim 22 wherein said secondary antenna comprises a flexible wire extending inside said hollow shaft part from said means for transmitting.*

*24. The system of claim 22 further including an inertia-activation switch electrically connected with said means for transmitting a radio-frequency signal and said power supply means to provide said means for transmitting with electrical power when said switch is activated.*

*25. The system of claim 24 wherein said inertia-activation switch is caused to be activated when said arrow is propelled by an archery bow.*

*26. The system of claim 24 wherein said inertia-activation switch includes a first wire contact which consists of a torsion spring, and a metal weight attached to a second end of said torsion spring for contacting with a second wire contact.*

* * * * *